(12) United States Patent
Kamper et al.

(10) Patent No.: US 6,963,937 B1
(45) Date of Patent: Nov. 8, 2005

(54) METHOD AND APPARATUS FOR PROVIDING CONFIGURABILITY AND CUSTOMIZATION OF ADAPTIVE USER-INPUT FILTRATION

(75) Inventors: Robert Julian Kamper, Round Rock, TX (US); Michael Anthony Paolini, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 761 days.

(21) Appl. No.: 09/213,660

(22) Filed: Dec. 17, 1998

(51) Int. Cl.⁷ .............................................. G06F 3/033
(52) U.S. Cl. .......................... 710/73; 710/62; 710/72; 345/156; 715/866
(58) Field of Search .................. 345/326, 333, 345/334, 700, 744–747, 156, 163, 167, 179, 157, 160, 161, 173, 184; 715/700, 707, 744–747, 856, 865, 866; 710/62, 65, 72, 73

(56) References Cited

U.S. PATENT DOCUMENTS

| | | | |
|---|---|---|---|
| 5,157,384 A | | 10/1992 | Greanias et al. ............ 340/706 |
| 5,163,111 A | | 11/1992 | Baji et al. ...................... 395/22 |
| 5,600,781 A | * | 2/1997 | Root et al. ................... 395/326 |
| 5,680,617 A | | 10/1997 | Gough et al. ............... 707/104 |
| 5,686,937 A | | 11/1997 | Li ............................... 345/123 |
| 5,710,884 A | * | 1/1998 | Dedrick ....................... 709/217 |
| 5,726,688 A | | 3/1998 | Siefert et al. ............... 345/352 |
| 5,726,898 A | * | 3/1998 | Jacobs ........................ 700/231 |
| 5,974,413 A | * | 10/1999 | Beauregard et al. ........... 707/6 |
| 6,081,750 A | * | 6/2000 | Hoffberg et al. ............. 700/17 |

FOREIGN PATENT DOCUMENTS

| | | | |
|---|---|---|---|
| EP | 0591044 | 10/1997 | ............. G06F/3/00 |
| EP | 0919906 | 6/1999 | ............. G06F/3/00 |
| JP | JO3071322 | 3/1991 | ............. G06F/3/03 |
| JP | 10/003353 | 1/1998 | ............. G06F/3/033 |
| JP | 10-055467 | 2/1998 | ............. G07D/9/00 |
| JP | 10-154038 | 6/1998 | ........... G06F/3/033 |

OTHER PUBLICATIONS

Ito, "Utility Research", Nikkei WinPC, Nikkel BP Co., vol. 5, No. 1, pp. 252–255, Jan. 1999 (Dec. 1998 received in Software Information Center Foundation).

* cited by examiner

*Primary Examiner*—Ilwoo Park
(74) *Attorney, Agent, or Firm*—Duke W. Yee; Jeffrey S. LaBaw; Stephen J. Walder, Jr.

(57) ABSTRACT

A computer system provides a user with an ability to configure a filter, according to a user's personal characteristics, for user-input data generated by an input device. It also provides a configurable, customizable, adaptive filter for individualizing user settings, parameters, or algorithms so that the system adapts to user-specific characteristics in order to minimize "errors" in the use of input devices. Moreover, the individual characteristics are portable with the user through the use of a customized adaptive input profile. The customized adaptive input profile may be stored on a network or within a smart card so that the customized parameters are accessible when the user requires the use of a particular client or workstation in a distributed data processing environment.

40 Claims, 7 Drawing Sheets

METHOD AND APPARATUS FOR PROVIDING CONFIGURABILITY AND CUSTOMIZATION OF ADAPTIVE USER-INPUT FILTRATION

BACKGROUND OF THE INVENTION

1. Technical Field

The present invention relates to a method and apparatus for data processing. Specifically, the method involves creation of user-input data in a graphical user interface in a computer system.

2. Description of Related Art

Graphical user interfaces, or "GUI's" as they are often designated, are an increasingly common and popular feature of computers, especially personal computers (PC's). One of the many advantages of such GUI's is that they allow a user to enter commands by selecting and manipulating graphical display elements, such as icons, through a variety of input devices. GUI's significantly reduce the amount of information that a user must recall in order to use a computer effectively. As a result of the ever-increasing popularity of GUI's, a variety of different means for using and navigating through various applications have been developed.

Various methods currently exist for allowing a user to control aspects of pointing device operation. For example, the Microsoft Windows interface enables a user to access a mouse dialog box whereby the user can adjust the tracking speed, which refers to the speed at which the mouse pointer moves across the display, and double-click speed, which refers to the rate at which Windows recognizes double-clicks of a mouse button. One feature of the mouse that is not controllable using the Windows GUI is an adaptive responsiveness of the pointer displayed on a display device to mouse movement. Such a feature would be especially beneficial in cases where the user is a small child or an older person, neither of whom typically have the manual dexterity necessary to control a mouse or other pointing device accurately, and hence, the position of the pointer on the display. There are also a set of disabilities that make the regular operation of a pointing device difficult and possibly impossible, such as trembling hands/fingers. As our population grows older and becomes increasingly dependent on computers, this will become more of an issue.

The problems associated with using pointing devices can be broadened by recognizing that similar problems may be associated with input devices in general. For example, if a person generally speaks with a stutter, the input voice patterns may be poorly recognized for that person by a voice recognition system. In another case, the person's stutter may make voice annotations impractical.

In these cases, a person may be unable to effectively use certain aspects of the computer system without extensive efforts to customize the computer system so that it is adapted to the personal characteristics of the user.

SUMMARY OF THE INVENTION

The present invention provides a user with an ability to configure a filter, according to a user's personal characteristics, for user-input data generated by an input device. Moreover, in a preferred implementation the individual characteristics are portable with the user through the use of a customized adaptive input profile. The customized adaptive input profile may be stored on a network or within a smart card so that the customized parameters are accessible when the user requires the use of a particular client or workstation in a distributed data processing environment, a stand-alone device capable of utilizing a customized adaptive input profile, or a device capable of operating in both connected and stand-alone mode.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
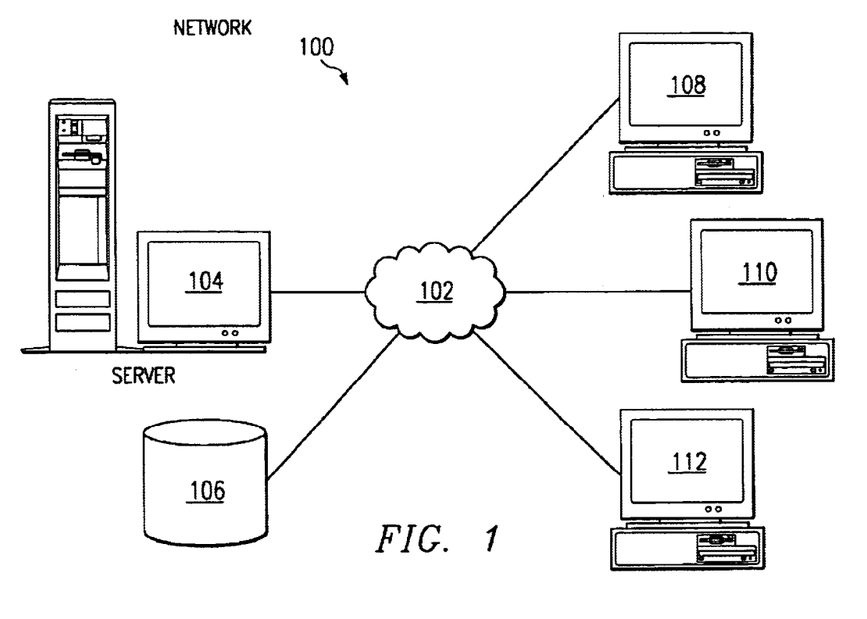
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems that route data and messages. Of course, distributed data processing system 100 also may be implemented as a number of different types of networks, such as for example, an intranet, a local area network (LAN), or a wide area network (WAN).

FIG. 1 is intended as an example, and not as an architectural limitation for the processes of the present invention.

Figure 2:
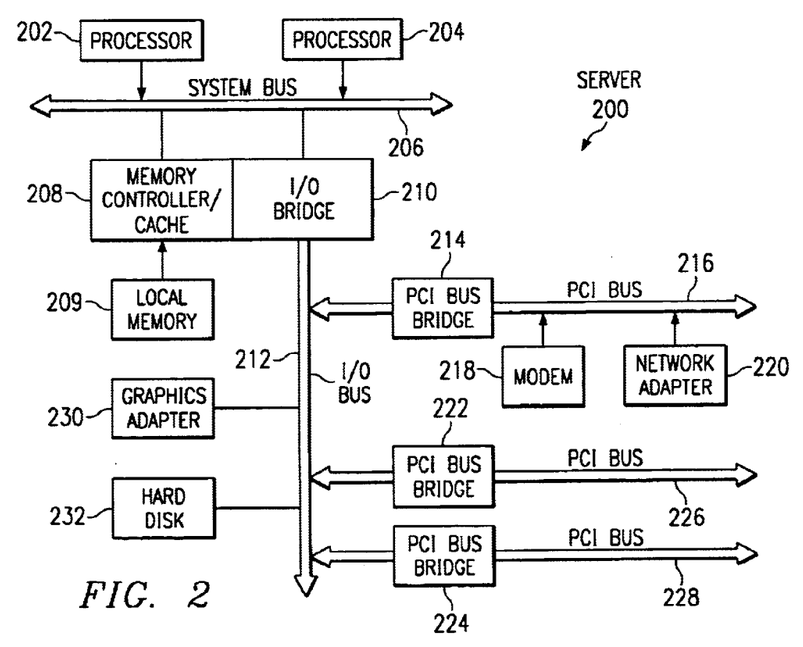
FIG. 2 is a block diagram depicting a data processing system, which may be implemented as a server in a distributed data processing system.

Referring to FIG. 2, a block diagram depicts a data processing system, which may be implemented as a server, such as server 104 in FIG. 1, in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212, as depicted either directly or indirectly.

Those of ordinary skill in the art will appreciate that the hardware depicted in FIG. 2 may vary. For example, other peripheral devices, such as optical disk drive and the like, also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
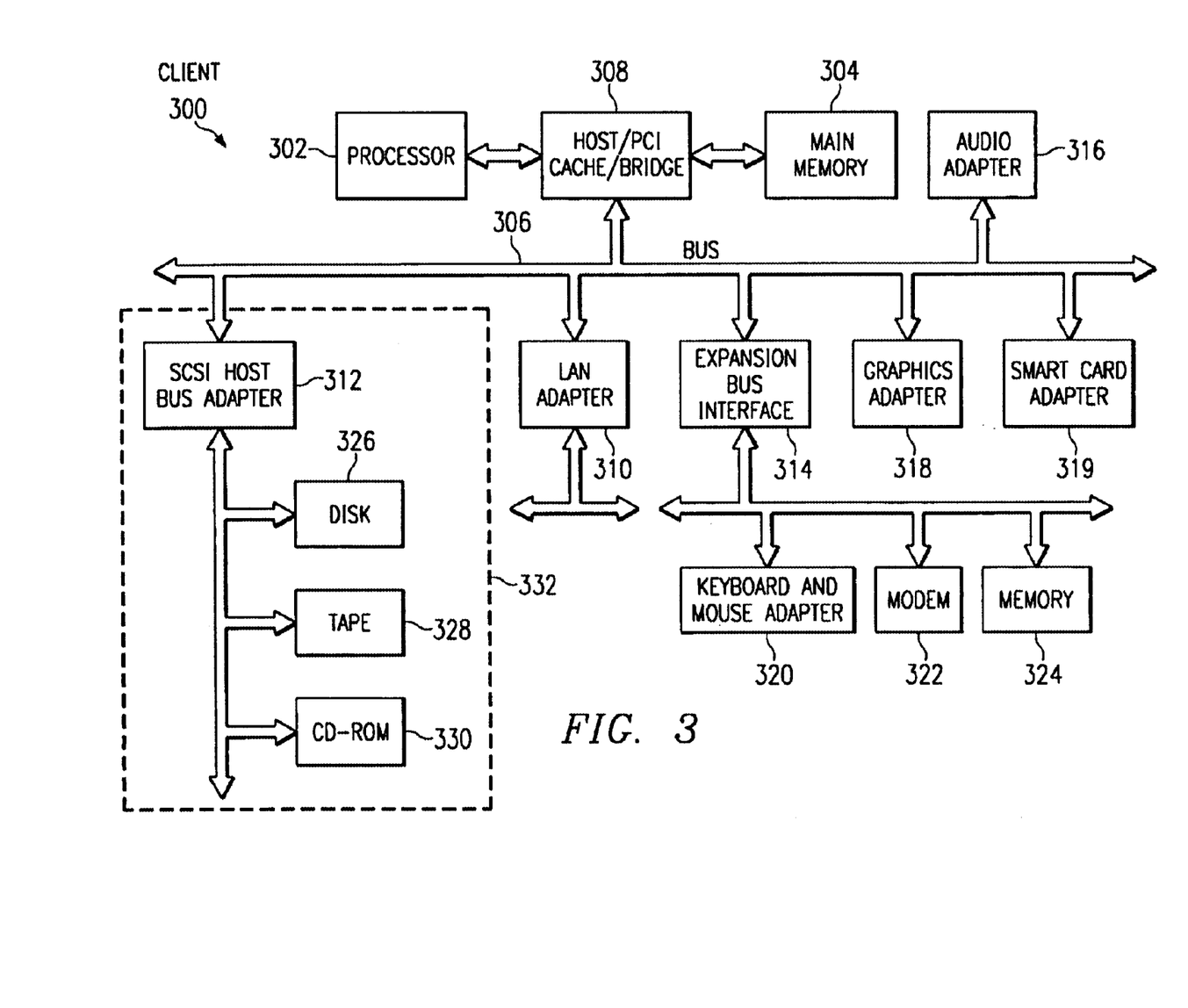
FIG. 3 is a block diagram illustrating a general data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and smart card adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330 in the depicted example. Typical PCI local bus implementations will support three or four PCI expansion slots or add-in connectors. Data processing system 300 could be connected through graphics adapter 318 to a computer display (not shown) and through smart card adapter 319 to a smart card reader (not shown).

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java™ may run in conjunction with the operating system and provides calls to the operating system from Java™ programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302. Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by the box with the dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations with respect to the present invention.

Certain classes of users encounter difficulty while using input devices. Such users would include novices, individuals with poor fine-motor-movement control, individuals with medical conditions or symptoms that cause involuntary tremors or motion that would be translated to movement of the pointing device using the ordinary settings for control. The present invention provides these classes of users with an easy method of customizing a computer system's adaptive filtering properties that are used during the acquisition of input data from an input device. In order to provide this capability, the present invention analyzes a user's unfiltered input data in order to create a customized adaptive input profile for the user. In so doing, the present invention masks the difficulties that a user would encounter in setting parameters using prior art methods. Use of the present invention would provide several advantages, including reduction of errors in input, increased usability and user satisfaction with computer system use, individually customizable settings for individual users of the same hardware, and adaptability of the computer system to changes in the user's physical condition or behavior.

Figure 4:
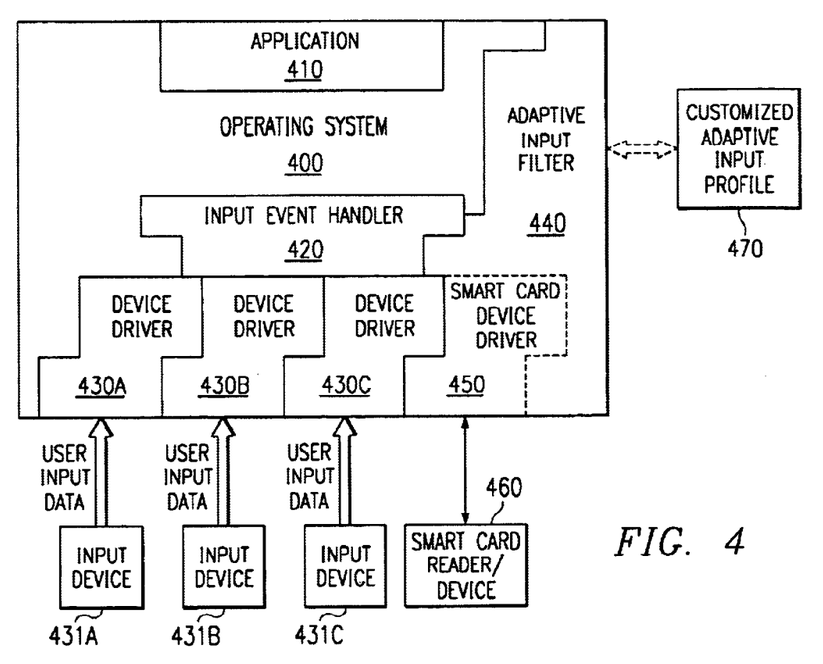
FIG. 4 is a block diagram depicting software components or modules that may be found in a data processing system that implements the present invention.

With reference now to FIG. 4, a block diagram depicts software components or modules that may be found in data processing system 300 to implement the present invention. The components shown in FIG. 4 are meant to be exemplary only and should not be used to limit the functionality of adaptive input filter 440 or customized adaptive input profile 470.

Operating system 400 provides access to system hardware and resources through application programming interfaces (API's). An API such as input event handler 420 might transfer input data from a user through operating system 400 to an application or applet that expects to receive the user input. An application, such as application 410, then processes the user data to accomplish user tasks and may present the user data to a user through a graphical user interface. Application 410 calls functions or methods in the API of input event handler 420 in order to receive the user input data. Input event handler 420 provides a high-level software interface between application 410 and the low-level software interface provided by device drivers 430A–430C. In this manner, application 410 receives input data or messages for input events after input processing within operating system 400. Significant data processing may be performed on the user input within operating system 400 before application 410 receives the user input data.

Input event handler 420 provides input events by receiving either raw input data from device drivers 430A–430C or filtered or massaged input data from adaptive input filter 440. Device drivers 430A–430C provide a low-level software interface between the hardware of data processing system 300 and the hardware represented by input devices 431A–431C. Input devices 431A–431C may be devices such as a mouse or keyboard (not shown in FIG. 3) in data processing system 300. A keyboard or mouse would be connected to data processing system 300 through keyboard and mouse adapter 320. Input devices 431A–431C generate hardware interrupts in standard protocols to signal data processing system 300 and to provide data to hardware adapters such as keyboard and mouse adapter 320. Device drivers 430A–430C then receive the interrupts and data through registered interrupt sectors within operating system 400 in a manner that is well known in the art.

Device driver 430A may be identical to device driver 430B or similar to device driver 430B if input device 431A is identical to or similar to input device 431B. Separate instances of identical device drivers may be registered in operating system 400 in order to provide hardware and system support for similar input devices. A plurality of similar input devices could be connected to data processing system 300 if data processing system 300 is employed as a multi-user device or in a multi-user environment such as a game console with similar input devices for multiple users.

Device drivers 430A–430C accept the user input data and buffer the data for further processing within operating system 400. Other software components, such as input event handler 420 or adaptive input filter 440, may query a device driver in order to receive or transfer the buffered input data. Input event handler 420 may receive the input data from a device driver and package the data into an input event that is queued to application 410.

Adaptive input filter 440 may provide an intermediate-processing step between device drivers 430A–430C and input event handler 420. Adaptive input filter 440 filters or massages the user input data in order to provide adaptive processing of user input data that is individualized or customized to a specific user. In order to act as an intermediate processing step for the input data, adaptive input filter 440 may have registered or hooked various methods into input event handler 420 so that input events are routed through adaptive input filter 440 before being routed to application 410. In this manner, adaptive input filter 440 may massage or filter the input data before application 410 receives the raw input events. Rather than acting or processing raw input data, application 410 will process the massaged or filtered user input data that it receives from adaptive input filter 440. The intermediate processing, provided by adaptive input filter 440, would be transparent to application 410.

Adaptive input filter 440 filters or massages the user input data according to customized adaptive input profile 470. Customized adaptive input profile 470 contains predetermined, individualized, or customized user settings, characteristics, parameters, or algorithms that describe the manner in which the input data from a particular type of input device in use by a particular user should be filtered or massaged. As the user has previously configured customized adaptive input profile 470, the output data from application 410 based upon the filtered input data will be displayed to the user through a graphical user interface in a manner which will be expected by the user. Because a user has previously configured the adaptive input filter 440, any input data echoed to a display device will not be a true reflection of the raw input data generated by input devices 430A–430C, yet the specific user should recognize that the output data generated by application 410 is not in error but rather is in accordance with the previously configured customized adaptive input profile 470.

As shown by the dotted lines in FIG. 4, the customized adaptive input profile 470 may be stored external to application 410 or operating system 400 on a distributed data processing system 100 or network 102. Adaptive input filter 440 may retrieve customized adaptive input profile 470 across network 102 or may retrieve it locally within data processing system 300 depending upon the hardware configuration of data processing system 300 and the software configuration choices registered within operating system 400. If customized adaptive input profile 470 is stored on network 102, customized adaptive input profile 470 is available to a specific user whenever the specific user uses a data processing system 300 on network 102. For example, if a user establishes a session on clients 108, 110, or 112, customized adaptive input profile 470 will be available to all clients. In this manner, the individualized or customized user settings and parameters are portable with the user. In other words, a network-computing environment that is user-aware will provide the individual characteristics and settings from customized adaptive input profile 470 such that they are portable with the user.

Rather than storing customized adaptive input profile 470 on network 102, it may be alternatively stored on a smart card. A smart card is generally a small circuit board with built-in logic, firmware, and storage that provides the smart card with some kind of independent decision-making ability. Typically, a smart card is a credit card sized device that contains integrated circuits with limited amounts of "intelligence". By storing customized adaptive input profile 470 on a smart card, the user possesses an easily transportable physical device containing a user-specific profile for personally configuring the use of an input device.

Smart cards are currently becoming more widely used and accepted. They are expected to be used as personal identification devices in a wide range of applications and hardware devices. In such an environment, it would be unnecessary to have a separate smart card for every particular application or hardware device. In such an environment, a single smart card could be used to identify a specific user and to provide user-specific settings and preferences for a variety of input devices. The customized adaptive input profile 470 could be stored on a single smart card along with other user data such as bank account information, health records, etc.

A user may insert a smart card containing customized adaptive input profile 470 into a smart card reader or device 460 that interfaces with smart card device driver 450 in operating system 400. Adaptive input filter 440 could retrieve customized adaptive input profile 470 through smart card device driver 450. Smart card device driver 450 may provide a low-level software interface to smart card adapter 319.

By storing customized adaptive input profile 470 on network 102 or on a smart card, the adaptive input profile is readily available for filtering and massaging user input data from a class of input devices that has been previously configured for customized adaptive input. For example, a user could expect that an input device on client 108 functions in a customized manner similar to an input device of the same type on client 110 without requiring the user to perform a system configuration setup on the different client machines.

For example, a user could establish a session on client 108. As the user moves an input device, such as a mouse, the input device will generate input data that is filtered or massaged by adaptive input filter 440 in a manner which is expected by the user in accordance with customized adaptive input profile 470. In a different session established at some other time on client 110, the user's movement of an input device of the same type would generate similar input data after being massaged by adaptive input filter 440 on client 110, again, in accordance with customized adaptive input profile 470. The customized adaptive input profile 470 follows the user in a convenient manner without requiring the user to configure a local machine.

Customized adaptive input profile 470 may simply store parameters and settings as data values that are employed by adaptive input filter 440 in predetermined and pre-stored functions and algorithms within adaptive input filter 440. In this manner, customized adaptive input profile 470 may require relatively little memory. Alternatively, customized adaptive input profile 470 may contain adaptive programming as well as current settings and parameters. In this case, a user's customized profile stores the instructions for the specific massaging and filtering algorithms to accommodate that specific user's use of an input device. In other words, customized adaptive input profile 470 then provides the data and algorithms for massaging and filtering the input data generated by that user's manipulation of a class of input devices. Adaptive input filter 440 would employ the parameters and algorithms from customized adaptive input profile 470 in its processing of the user input data rather than using the algorithms pre-stored within adaptive input filter 440.

One example of a filtering algorithm applied to user-input data would be a smoothing function applied to mouse-movement data when the user has provided a customized adaptive input profile with settings or parameters for a mouse device. The user may desire to customize the mouse movement to overcome a personal, physical disability of a hand tremor. In this case, the smoothing function may calculate a mouse pointer speed over a screen coordinate space and an inertial constant. Rather than transferring the current pointer position as input data, the filter may generate user-input data of approximate coordinate-space positions for the pointer by computing new locations based upon previous locations, the speed of the movement of the mouse, inertial values, and a combination of parameters retrieved from the customized adaptive input profile. The pointer on the display device will then track the mouse movement in a customized manner.

Figure 5:
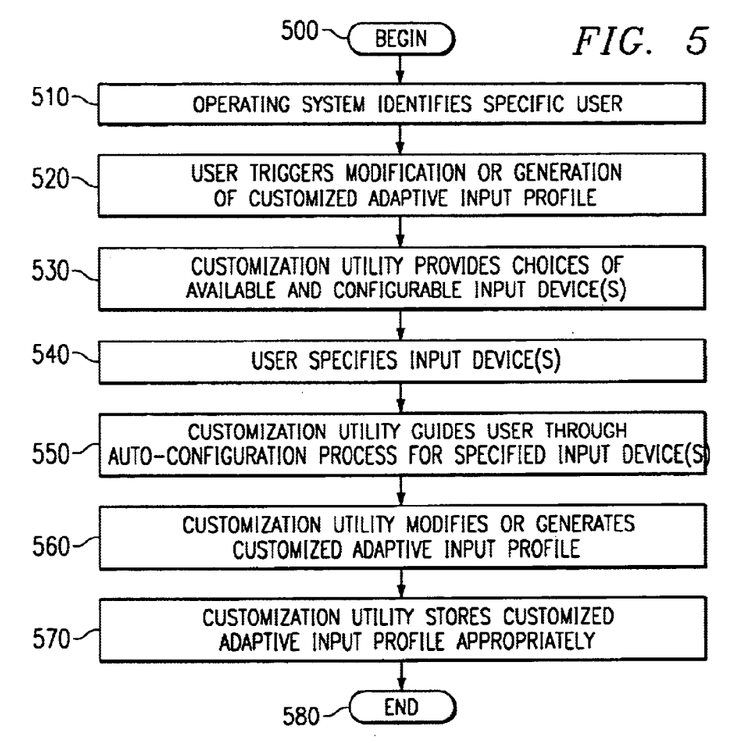
FIG. 5 is a flowchart depicting a process for customization, auto-configuration, and storage of a customized adaptive input profile.

With reference now to FIG. 5, a flowchart depicts a process for customization, auto-configuration, and storage of a customized adaptive input profile. The process begins (step 500) with the operating system 400 identifying a specific user (step 510). As each user logs on to operating system 400 and establishes a user session, operating system 400 must identify a specific user from the many users registered on network 102 or data processing system 300. The identification may be accomplished by the user inputting a user ID and password or, alternatively, a user may insert a smart card into smart card reader/device 460. As smart card device 460 reads the user's smart card, smart card device driver 450 may relay user identification data to operating system 400 so that it may identify a user that desires to establish a session on operating system 400. Other well-known manners may be used to identify a specific user, such as voice print analysis, fingerprint identification, etc.

The customization process continues when a user triggers modification or generation of customized adaptive input profile 470 (step 520). The user may generate the request through a system command or utility by selecting an icon that provides access to the auto configuration process. The particular manner in which operating system 400 presents the customization and auto-configuration process or utility may vary among different operating systems or various local installations of operating system 400. If adaptive input filter 440 is a prominent feature within operating system 400, operating system 400 may provide a quick and easy method for accessing the auto-configuration utility through a one-step process on the desktop of the graphical user interface presented by operating system 400 on data processing system 300. Operating system 400 may provide default processing in which an auto-configuration utility is automatically presented to the user when operating system 400 cannot access or cannot locate a customized adaptive input profile 470 for the specific user. Alternately, the operating system 400 may activate an auto-configuration utility based on analysis of user input. The determination of the need to execute the auto-configuration utility should not be limited to the examples described above as many different methods may be employed to determine when a user requires the modification or generation of customized adaptive input profile 470.

The customization process continues when the customization or auto-configuration utility provides choices to the user of the available and configurable input device or devices that are present in data processing system 300 or client 108, 110, or 112 (step 530). The auto-configuration utility retrieves information from operating system 400 as to which devices should be presented to the user in a graphical user interface. Operating system 400 may poll for available input devices or may have pre-stored information concerning the registration of input devices 431A–431C. There may be instances of input devices that are available yet not configurable. However, it is envisioned that all input devices connected to operating system 400 are configurable as it is the input data generated by an input device which is being manipulated rather than the physical hardware of the input device.

The customization process continues when the user specifies a user-input device or multiple input devices to be configured or customized (step 540). Depending on the desires of the user and the availability of multiple devices, a user may specify a single input device or multiple input devices. If the user is configuring multiple input devices, then the customization process may loop in an iterative manner until all of the specified input devices have been configured. Although the description here provides for multiple input devices, the present invention is not limited to multiple device implementation, and is also intended to include implementations which are limited to a single input device.

The auto-configuration utility guides the user through the auto-configuration process for each specified input device (step 550). The user may be guided to manipulate or use an input device to generate input data that will be analyzed by the auto-configuration or customization utility. The manner in which the user manipulates or uses each input device will be dependent upon the type of input device.

The auto-configuration or customization utility then modifies or generates customized adaptive input profile 470 (step 560). By analyzing the previously generated input data from the input device to be customized, the auto-configuration or customization utility can determine appropriate settings and parameters for a specific user that will be retrieved at a later time to filter or massage the input data generated by an input device of the same type being used by the specific user. The auto-configuration or customization utility may also assign or generate an algorithm based on the analyzed user input data.

The customization process then continues with the storage of customized adaptive input profile 470 in an appropriate location (step 570). As noted previously with respect to FIG. 4, customized adaptive input profile 470 may be stored locally on data processing system 300, on network 102, or on a smart card. The customization utility chooses between these locations in an appropriate manner. For example, if a user has previously inserted a smart card into smart card reader 460, the customization utility may recognize the availability of storage on the smart card and may store customized adaptive input profile 470 on the smart card. If the user had established a session in a client-server environment in which all customized adaptive input profiles for all users were stored in a specific server on network 102, then the customization utility may store the newly modified or generated customized adaptive input profile 470 on the same server. The auto-configuration process then completes (step 580).

With reference now to FIGS. 6A–6F, graphical user interface windows depict an exemplary manner in which data processing system 300 may provide a user with the ability to execute an auto-configuration utility for configuring customized adaptive input profile 470. During the execution of the auto-configuration utility, as described above with respect to FIG. 5, a user selects one or multiple input devices to be configured and is then guided through various input activities in order to learn the physical capabilities of the user and/or the experience level of the user in manipulating or using various input devices.

Figure 6A:
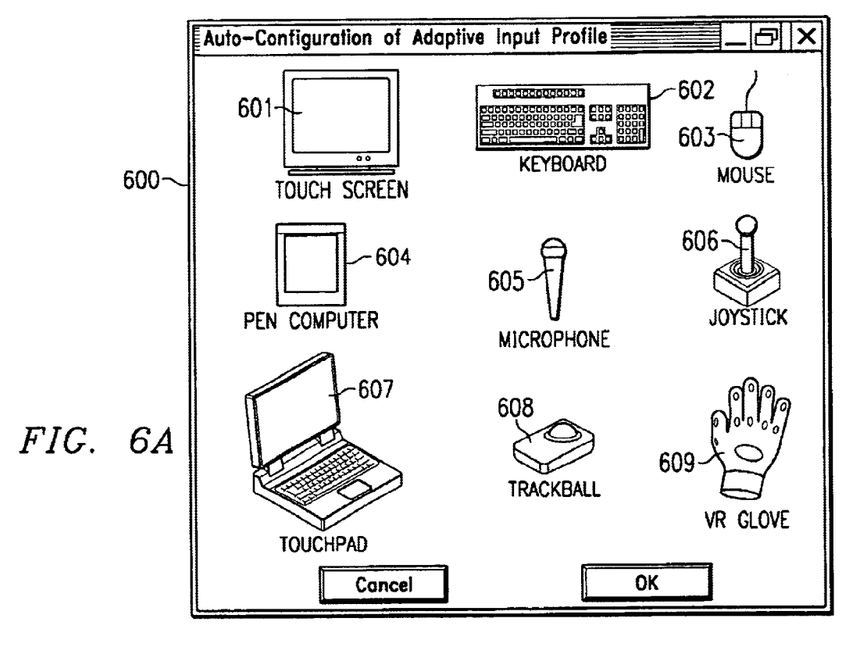
FIGS. 6A–6F depict exemplary graphical user interface windows in which a data processing system may provide a user with the ability to execute an auto-configuration utility for configuring a customized adaptive input profile.

FIG. 6A depicts a graphical user interface window 600 in which a user specifies which input device or devices the user intends to configure. The user would use the appropriate default input device as a pointing mechanism to choose the intended device or devices. Prior to displaying graphical user interface window 600 to the user, the auto-configuration utility has either detected the input devices that are available and configurable or has queried operating system 400 for information on the available and configurable input devices. Graphical user interface window 600 shows the following input devices that have been previously determined to be available and configurable: touch screen 601; keyboard 602; mouse 603; electronic pen or stylus 604; microphone 605; joystick 606; touch pad 607; track ball 608; virtual reality or VR glove 609. The listed input devices are merely examples of input devices that may be configured. However, the list should not be interpreted as being an exhaustive list of potentially available input devices. Moreover, most of the examples for the present invention involve the act of manipulation with respect to input devices with physical movement by human hand. However, input devices may be used rather than manipulated. For example, microphone 605 may be used without manipulation through input of sound waves.

Figure 6B:
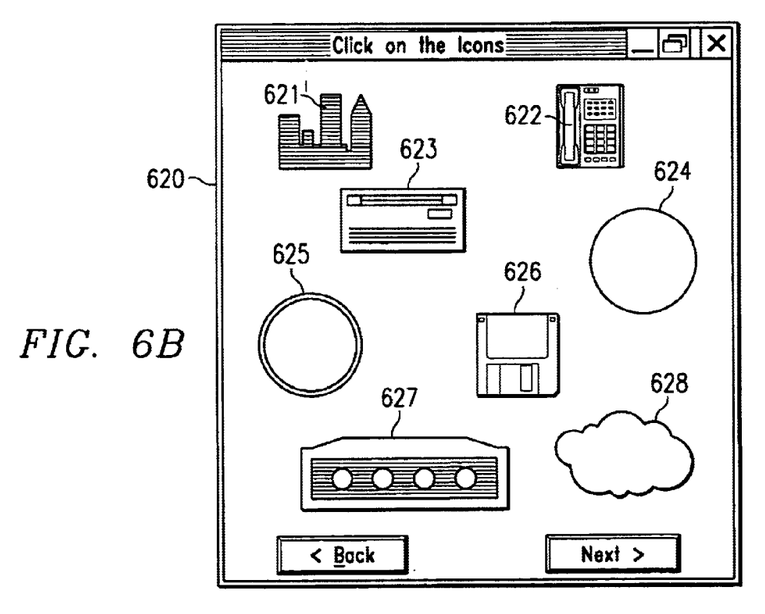

FIG. 6B depicts graphical user interface window 620 that presents icons 621–628. As shown in graphical user interface window 620, the user is instructed to click on the icons presented to the user. Each of the individual icons 621–628 may be highlighted in a sequential manner to indicate an icon upon which a user should click, or each of the icons 621–628 may be presented individually and sequentially in various regions of window 620 in order to require the user to move an input device and click on a newly designated region in which the individual icon appears. In this manner, the auto-configuration utility may judge the user's experience level or ability in moving the input device to reach the various regions of window 620. The user may also be instructed to click, double-click, or triple-click a button or other selector on the current input device. In this case, the auto-configuration utility will measure the user's speed in clicking the input device buttons or other selection mechanism.

While the various speeds of movement and uses of selection mechanisms may be limited by a user's physical capabilities, the various measurements made by the auto-configuration utility may simply be measuring the user's preferences in manipulating an input device. A casual user of an input device may be physically able to manipulate an input device as well as an experienced user but may choose to manipulate the input device more slowly. In either case, the auto-configuration utility may judge the manner in which a specific user manipulates an input device, generate appropriate user parameters, and then create or modify the specific user's customized adaptive input profile 470 accordingly. Similarly, mouse configuration for devices with two or more buttons must be manually set as right or left-handed currently. Many left-handed persons use a right-handed mouse configuration. This setting would be automatically set during the icon clicking activity in FIG. 6B.

Figure 6C:
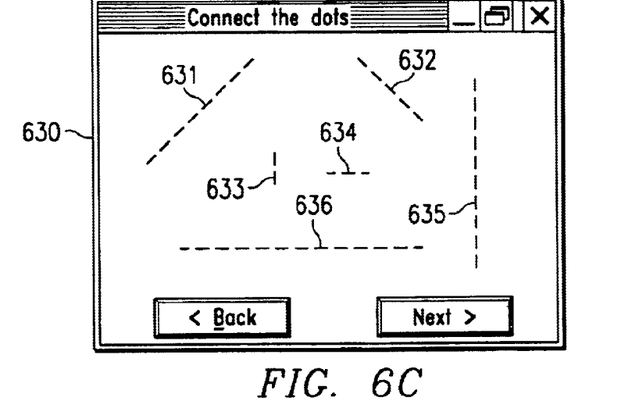
Figure 6D:
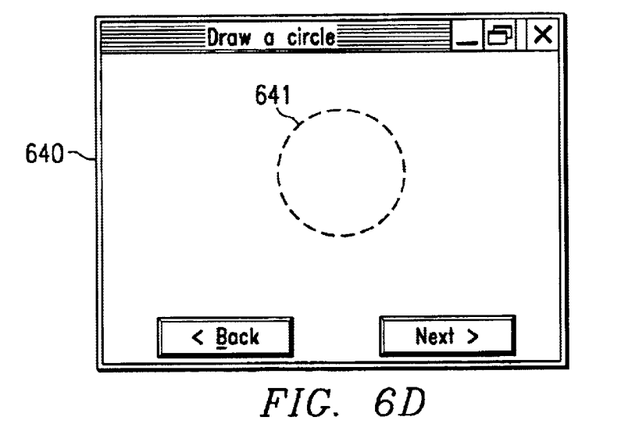
Figure 6E:
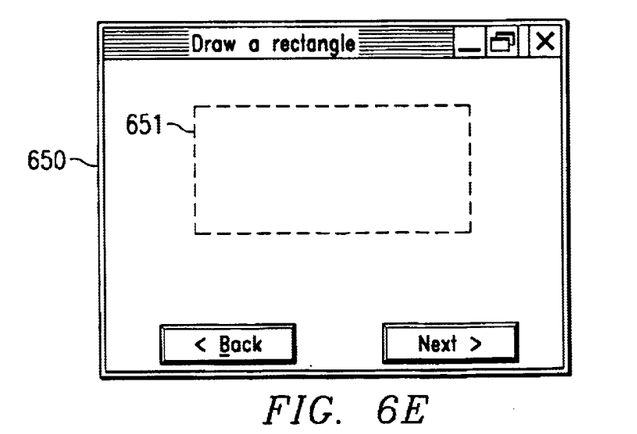
Figure 6F:
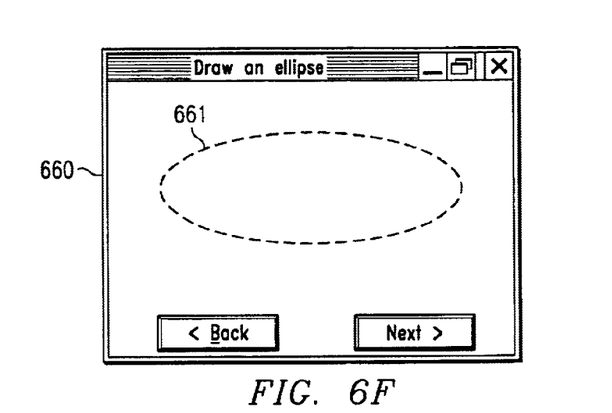

FIG. 6C depicts a graphical user interface window 630 in which a user is asked to draw lines 631–636. In FIG. 6D, graphical user interface window 640 depicts an example in which a user is instructed to draw a circle 641. In FIG. 6E, graphical user interface window 650 depicts an example in which a user is instructed to draw a rectangle 651. In FIG. 6F, a graphical user interface window 660 depicts an example in which a user is instructed to draw an ellipse 661. In each of the examples in FIGS. 6C–6F, the auto-configuration utility will track the user's motion time and intent in manipulating the input device. These examples are intended to be illustrative rather than exhaustive and the invention is not to be construed as limited to the specific examples provided.

As the user input data is captured, the auto-configuration utility may analyze and translate the user's ability to trace various geometric figures into appropriate settings, parameters, and algorithms that best enable a user to approximate the geometric figures. For example, a user with a muscular tremor may create jagged lines rather than straight lines. The auto-configuration utility would sense the user's inability to manipulate the input device to follow the geometric figures. The auto-configuration utility would then create appropriate settings, parameters, or algorithms which, when applied by adaptive input filter 440 to the input data generated by the user, massages or filters the input data in such a manner that the processed input data is presented through operating system 400 to application 410 as if a user manipulated the input device in a manner that closely approximates the geometric figure.

In this manner, data processing system 300 is trained so that it may compensate for preferences and physical limitations of particular users in a manner that assists the user in completing various input tasks. Adaptive input profile 470 may be modified so that it is preset or retrained when the capabilities of the specific user change. For persons who are physically challenged, adaptive input filter 440 may obviate the need for customized physical hardware. In another, less extreme circumstance, adaptive input filter 440 may merely compensate for handedness in particular users. For example, a left-handed user may use a VR glove that was specifically designed to be used by right-handed persons. Since the VR glove may generate data for a left-handed person improperly, customized adaptive input profile 470 may be created to compensate for the mis-aligned input generated by the left-handed person. In this case, a separate VR glove is not required for left-handed persons versus right-handed persons.

In order for adaptive input filter 440 to compensate for handedness in particular users, adaptive input filter 440 may require a handedness parameter within customized adaptive input profile 470. A handedness parameter may be set in a variety of manners. For example, the auto-configuration utility could detect handedness during the portion of the customization process shown in FIG. 6B. As described previously, FIG. 6B instructs a user to click on presented icons. By analyzing the user's method of selecting or clicking on icons, the auto-configuration utility could determine the user's preferences for a selection mechanism on the input device and set a parameter accordingly.

At some other time during a user's session on data processing system 300, outside of the use of the auto-configuration utility, adaptive input filter 440 may monitor the user's input and detect a pattern of use which implies a modification for generation of a handedness parameter setting. For example, a user may be neither left handed or right handed and may be ambidextrous. After the ambidextrous user has changed hands and used the input device in a slightly different manner, adaptive input filter 440 may detect the sequence of inputs indicating cross handed use.

For example, a common mouse button mapping scheme is typically given as the left button on the mouse being MouseButton1 and the right button on the mouse being MouseButton2.

Figure 6G:
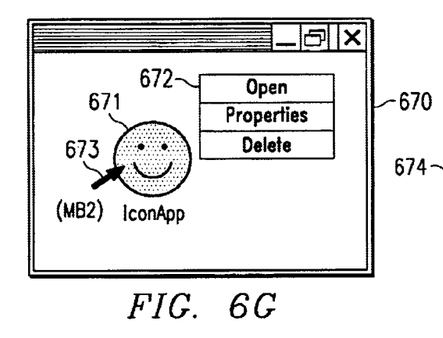
FIGS. 6G–6J depict exemplary graphical user interface windows in which a user may or may not identify a preference for a handedness parameter setting to be stored in customized adaptive input profile.
Figure 6H:
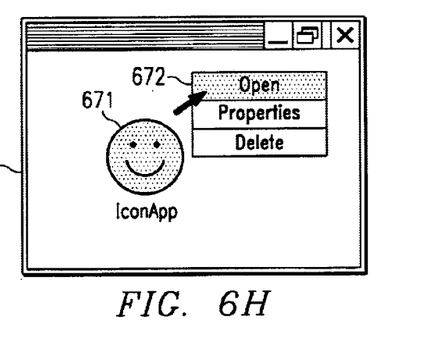

FIG. 6G shows a typical selection of an icon. In many graphical user interfaces, the use of MouseButton2 provides a secondary menu of actions that may be performed on a selected icon. Graphical user interface window 670 shows the selection of icon 671 representing application IconApp through pointing device or cursor 673 and selection of MouseButton2. With this action, menu 672 has been presented as a pop-up menu for the user. In most circumstances, the user will proceed to select one of the menu choices provided in the pop-up menu. The selected menu item provides an action that will be performed on the selected icon. In this case, no further mouse button actions are performed in conjunction with icon 671. Adaptive input filter 440 may then presume that the previous sequence of input actions were not directed to a change of the setting of the handedness parameter.

If, however, the user proceeds to provide another MouseButton event, the user may be indicating that the normal progression of selecting a menu item was not desired but instead a change in the handedness parameter was desired. In this case, the user may be performing an action similar to that shown in FIG. 6I. Graphical user interface window 675 shows a user clicking MouseButton1 on icon 671. Adaptive input filter 440 may detect this pattern of the second mouse button event as an indication to reset the handedness parameter.

Figure 6I:
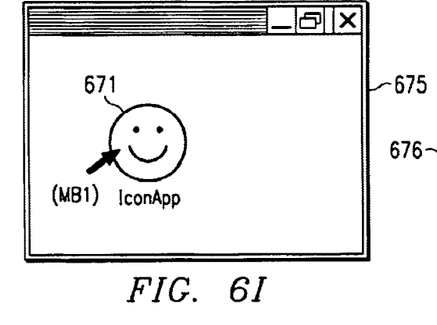
Figure 6J:
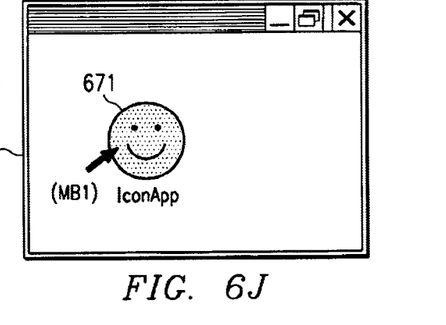

If the user then proceeds to select icon 671 with MouseButton1, adaptive input filter 440 may determine that a preference for right handedness has been provided. As a contrary example, if a user has selected icon 671 with MouseButton2, adaptive input filter 440 may have determined that the user was identifying a preference for left handedness.

Figure 6K:
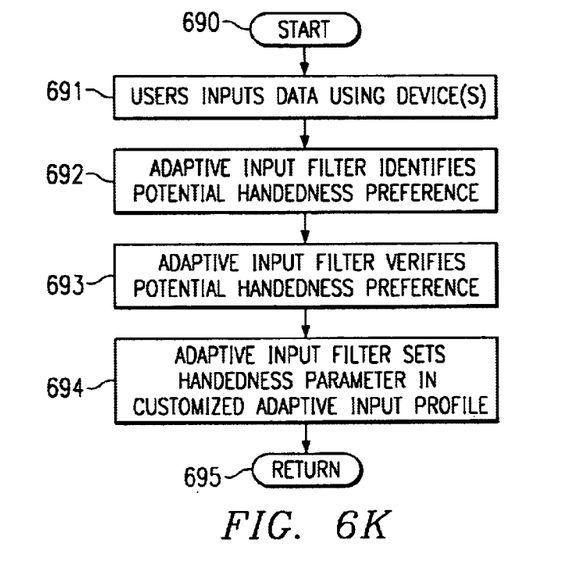
FIG. 6K depicts a flowchart for a general method in which a preference for a handedness parameter setting is identified, verified, and stored in customized adaptive input profile.

With reference now to FIG. 6K, a flowchart depicts a general method in which a preference for a handedness parameter setting is identified, verified, and stored in customized adaptive input profile 470. The process starts (step 690) with a user inputting data with an input device (step 691). Adaptive input filter 440 identifies a potential handedness preference in the pattern of use in the input device (step 692). Adaptive input filter 440 then verifies whether a user desires to set the potential handedness preference within customized adaptive input profile 470 (step 693). This may be verified through an appropriate method, such as a dialogue window. Adaptive input filter 440 then sets, upon confirmation, the handedness parameter and customized adaptive input profile 470 (step 694). The process then returns to the appropriate location (step 695).

The example given is not intended to limit the scope of the invention to a mouse input device but is intended to apply to other devices for which the handedness of operation may affect use.

Handedness may be determined while gathering input data on selecting icons, or it may be detected by detection of a specific pattern of use. Thus a novice or casual user could be identified when entering a program, such as through a prompt "click here to begin", whereas an expert user could trigger the change by repeating a pattern intentionally to switch handedness during operation.

These illustrations and examples are not intended to limit the current invention to those specific applications. A customized adaptive input profile could also be generated to account for individual and cultural differences in gestures used for selection or input, regardless of whether the input device used for gesture input was a VR glove, video camera, or other device.

Likewise, a customized adaptive input profile can be generated to "normalize" keyboard input by setting such attributes as repeat rate (typematic), "sticky keys", "bouncy keys", "slow keys", and so forth. These attributes would be controlled or modified through the customized adaptive input profile by keyboard-related parameters that are generated during the auto-configuration utility or by analyzing a specific pattern of use. For example, the auto-configuration utility may direct the user to type a sample sentence and correct errors within the sentence. During this period of typing, the user's characteristics of typing, such as overall speed, amount of time between keystrokes, quality of keystrokes, amount of typing mistakes, etc., are analyzed to generate the keyboard-related parameters. In this manner, the user is not required to be familiar with system-related terminology, such as "sticky keys" or "bouncy keys". Moreover, even if the user were familiar with these terms and with the fact that the user's system provides this capabilities, the user is not required to search through computer system utilities trying to find the location or interface that sets these parameters. Again, an expert user could trigger parameter changes by repeating a pattern intentionally to switch paremeter settings during operation.

Figure 7:
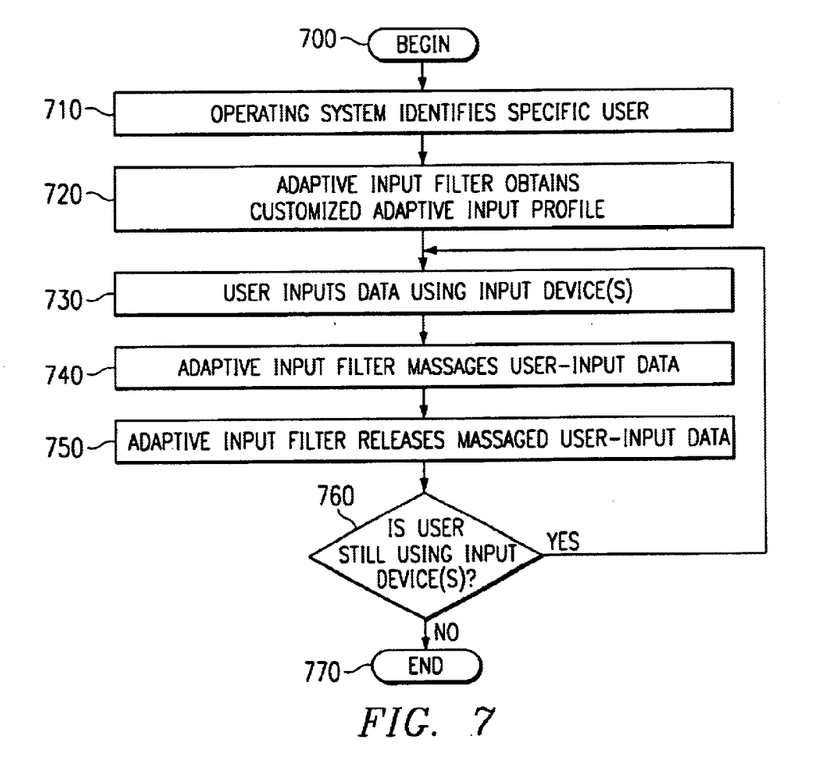
FIG. 7 is a flowchart depicting a process of using a customized adaptive input profile to filter user input data.

With reference now to FIG. 7, a flowchart depicts an example of using customized adaptive input profile 470 to filter user input data. The process begins (step 700) when operating system 400 identifies a specific user (step 710). As noted previously with-respect to FIG. 5, many equivalent methods may be used to identify a specific user. Once a specific user is identified, adaptive input filter 440 obtains customized adaptive input profile 470 for the particular user (step 720). As noted previously with respect to FIG. 4, customized adaptive input profile 470 may be stored in various locations, and adaptive input filter 440 retrieves customized adaptive input profile 470 from the appropriate location according to the method in which it has been stored. If the specific user has inserted a smart card into smart card reader 460, adaptive input filter 440 will retrieve customized adaptive input profile 470 from the smart card on which it is stored. If operating system 400 is configured such that all adaptive input profiles are stored on a server on network 102, adaptive input filter 440 will retrieve customized adaptive input profile 470 across the network.

The process continues when a user manipulates an input device to generate user input data (step 730). An input device may send the input data to a device driver that routes the user input data to adaptive input filter 440 for intermediate processing before adaptive input filter 440 releases the processed data to input event handler 420.

After adaptive input filter 440 receives the user input data, it will massage or filter the recently received user input data to create user input data according to customized adaptive input profile 470. As noted previously with respect to FIGS. 4 and 6, adaptive input filter 440 may employ various methods for filtering and massaging the user input data.

Adaptive input filter 440 releases the filtered or massaged user input data by sending or transferring the data to input event handler 420 (step 750). A determination is then made as to whether the user is still using the input device (step 760). If it is determined that the user is still using the input device, then the process returns to step 730 so that the user may continue to input data using the input device. If it is determined that the user is not using the input device, then the process completes (step 770).

As described above with respect to FIGS. 4–7, the present invention provides a user with an ability to configure a filter for the input data generated by an input device according to a user's personal characteristics. The present invention provides a graphical user interface shell or wrapper for individualizing user settings, parameters, or algorithms so that the system adapts to user-specific characteristics in order to minimize "errors" in the use of input devices. Moreover, the individual characteristics are portable with the user through the use of a customized adaptive input profile. The customized adaptive input profile may be stored on a network or within a smart card so that the customized parameters are accessible when the user requires the use of a particular client or workstation in a distributed data processing environment. Another advantage of the present invention is that it minimizes the differences between someone with much greater experience or greater physical capacity over someone with limited experience or limited capacity.

Previous input methods have used mapping techniques so that a specific input pattern from a particular user is mapped to a particular encoded value. For example, a voice recognition system may be trained to recognize the particular sound data input pattern generated by the voice of a user in an attempt to map the sound data to a specific encoded value. In this invention, generic input patterns are filtered and massaged in a continuous process that is not dependent upon recognition of discrete input patterns. For example, if a person generally speaks with a stutter, the customized adaptive input profile for that person may contain the appropriate parameters so that all input voice data from that person is massaged and filtered in a manner that corrects for the stutter in the input voice patterns so that the system may properly recognize all of the voice patterns input by that particular person. In other words, previous systems, such as gesture recognition systems or voice recognition systems, have been tailored to recognize and filter particular input patterns for a particular input device. In the present invention, input devices can be customized on-the-fly and in a portable and convenient manner. In addition, the design of the present invention allows for easy maintenance and extension through inclusion of additional input devices and/or algorithms to improve adaptation.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for processing input data from a user of a data processing system, the method comprising:
   receiving input pointer data generated by a hand manipulated pointer input device;
   filtering the input pointer data according to an adaptive input profile customized for the user to generate improved input pointer data, wherein pointer manipulation from the improved input pointer data more closely corresponds to the user's intent than does the input pointer data.

2. The method as recited in claim 1, wherein the adaptive input profile comprises a smoothing algorithm for smoothing discontinuities in the user's manipulation of the hand manipulated pointer input device.

3. A method for processing input data from a user of a data processing system, the method comprising:
   receiving input pointer data generated by a hand manipulated pointer input device;
   filtering the input pointer data according to an adaptive input profile customized for the user to generate improved input pointer data, wherein pointer manipulation from the improved input pointer data more closely corresponds to the user's intent than does the input pointer data, wherein the adaptive input profile is used to compensate for mis-alignment of the hand manipulated pointer input device with a specified handedness when utilized by a user with an opposite handedness.

4. The method as recited in claim 1, wherein the hand manipulated pointer input device comprises one of a mouse, a stylus, a trackball, a joystick, a touchpad, and a virtual reality glove.

5. The method as recited in claim 1, wherein the filtering step comprises processing the input pointer data from a rough set of x-y coordinates to an improved set of x-y coordinates.

6. The method as recited in claim 1, further comprising:
   prior to the filtering step, creating the adaptive input profile based on the user's attempted manipulation of the hand manipulated pointer input device to generate a predefined figure thereby determining how the user's manipulation ability differs from an average person's manipulation ability.

7. The method as recited in claim 6, wherein the predefined figures comprises one of a circle, an ellipse, a square, and a line.

8. The method as recited in claim 1, wherein the adaptive input profile is stored on a smart card.

9. The method as recited in claim 1, further comprising:
   learning the manipulation capabilities of the user from user attempts at manipulating the hand manipulated pointer input device; and
   using the manipulation capabilities of the user to create the adaptive input profile.

10. The method as recited in claim 1, further comprising:
    modifying the adaptive input profile in response to information determined from the received input pointer data.

11. A computer program product in a computer readable media for use in a data processing system for processing input data from a user of a data processing system, the computer program product comprising:
    receiving instructions for receiving input pointer data generated by a hand manipulated pointer input device;
    filtering instructions for filtering the input pointer data according to an adaptive input profile customized for the user to generate improved input pointer data, wherein pointer manipulation from the improved input pointer data more closely corresponds to the user's intent than does the input pointer data.

12. The computer program product as recited in claim 11, wherein the adaptive input profile comprises a smoothing algorithm for smoothing discontinuities in the user's manipulation of the hand manipulated pointer input device.

13. A computer program product in a computer readable media for use in a data processing system for processing input data from a user of a data processing system, the computer program product comprising:
    receiving instructions for receiving input pointer data generated by a hand manipulated pointer input device;
    filtering instructions for filtering the input pointer data according to an adaptive input profile customized for the user to generate improved input pointer data, wherein pointer manipulation from the improved input pointer data more closely corresponds to the user's intent than does the input pointer data, wherein the adaptive input profile is used to compensate for mis-alignment of the hand manipulated pointer input device with a specified handedness when utilized by a user with an opposite handedness.

14. The computer program product as recited in claim 11, wherein the hand manipulated pointer input device comprises one of a mouse, a stylus, a trackball, a joystick, a touchpad, and a virtual reality glove.

15. The computer program product as recited in claim 11, wherein the filtering instructions comprises processing the input pointer data from a rough set of x-y coordinates to an improved set of x-y coordinates.

16. The computer program product as recited in claim 11, further comprising:
    creating instructions for creating the adaptive input profile based on the user's attempted manipulation of the band manipulated pointer input device to generate a predefined figure thereby determining how the user's manipulation ability differs from an average person's manipulation ability.

17. The computer program product as recited in claim 16, wherein the predefined figures comprises one of a circle, an ellipse, a square, and a line.

18. The computer program product as recited in claim 11, wherein the adaptive input profile is stored on a smart card.

19. The computer program product as recited in claim 11, further comprising:
    learning instructions for learning the manipulation capabilities of the user from user attempts at manipulating the hand manipulated pointer input device; and
    using instructions for using the manipulation capabilities of the user to create the adaptive input profile.

20. The computer program product as recited in claim 11, further comprising:
    modifying instructions for modifying the adaptive input profile in response to information determined from the received input pointer data.

21. A system for processing input data from a user of a data processing system, the system comprising:
    receiving means for receiving input pointer data generated by a hand manipulated pointer input device;

filtering means for filtering the input pointer data according to an adaptive input profile customized for the user to generate improved input pointer data, wherein pointer manipulation from the improved input pointer data more closely corresponds to the user's intent than does the input pointer data.

22. The system as recited in claim 21, wherein the adaptive input profile comprises a smoothing algorithm for smoothing discontinuities in the user's manipulation of the hand manipulated pointer input device.

23. A system for processing input data from a user of a data processing system, the system comprising:
   receiving means for receiving input pointer data generated by a hand manipulated pointer input device;
   filtering means for filtering the input pointer data according to an adaptive input profile customized for the user to generate improved input pointer data, wherein pointer manipulation from the improved input pointer data more closely corresponds to the user's intent than does the input pointer data, wherein the adaptive input profile is used to compensate for mis-alignment of the hand manipulated pointer input device with a specified handedness when utilized by a user with an opposite handedness.

24. The system as recited in claim 21, wherein the hand manipulated pointer input device comprises one of a mouse, a stylus, a trackball, a joystick, a touchpad, and a virtual reality glove.

25. The system as recited in claim 21, wherein the filtering means comprises processing the input pointer data from a rough set of x-y coordinates to an improved set of x-y coordinates.

26. The system as recited in claim 21, further comprising:
   creating means for creating the adaptive input profile based on the user's attempted manipulation of the hand manipulated pointer input device to generate a predefined figure thereby determining how the user's manipulation ability differs from an average person's manipulation ability.

27. The system as recited in claim 26, wherein the predefined figures comprises one of a circle, an ellipse, a square, and a line.

28. The system as recited in claim 21, wherein the adaptive input profile is stored on a smart card.

29. The system as recited in claim 21, further comprising:
   learning means for learning the manipulation capabilities of the user from user attempts at manipulating the hand manipulated pointer input device; and
   using means for using the manipulation capabilities of the user to create the adaptive input profile.

30. The system as recited in claim 21, further comprising:
   modifying means for modifying the adaptive input profile in response to information determined from the received input pointer data.

31. A data processing system in a computer readable media for use in a data processing system for processing input data from a user of a data processing system, the data processing system comprising:
   a receiver which receives input pointer data generated by a hand manipulated pointer input device;
   a filter which filters the input pointer data according to an adaptive input profile customized for the user to generate improved input pointer data, wherein pointer manipulation from the improved input pointer data more closely corresponds to the user's intent than does the input pointer data.

32. The data processing system as recited in claim 31, wherein the adaptive input profile comprises a smoothing algorithm for smoothing discontinuities in the user's manipulation of the hand manipulated pointer input device.

33. A data processing system in a computer readable media for use in a data processing system for processing input data from a user of a data processing system, the data processing system comprising:
   a receiver which receives input pointer data generated by a hand manipulated pointer input device;
   a filter which filters the input pointer data according to an adaptive input profile customized for the user to generate improved input pointer data, wherein pointer manipulation from the improved input pointer data more closely corresponds to the user's intent than does the input pointer data, wherein the adaptive input profile is used to compensate for mis-alignment of the hand manipulated pointer input device with a specified handedness when utilized by a user with an opposite handedness.

34. The data processing system as recited in claim 31, wherein the hand manipulated pointer input device comprises one of a mouse, a stylus, a trackball, a joystick, a touchpad, and a virtual reality glove.

35. The data processing system as recited in claim 31, wherein the filter processes the input pointer data from a rough set of x-y coordinates to an improved set of x-y coordinates.

36. The data processing system as recited in claim 31, further comprising:
   a profile creation unit which creates the adaptive input profile based on the user's attempted manipulation of the hand manipulated pointer input device to generate a predefined figure thereby determining how the user's manipulation ability differs from an average person's manipulation ability.

37. The data processing system as recited in claim 36, wherein the predefined figures comprises one of a circle, an ellipse, a square, and a line.

38. The data processing system as recited in claim 31, wherein the adaptive input profile is stored on a smart card.

39. The data processing system as recited in claim 31, further comprising:
   a learning unit which learns the manipulation capabilities of the user from user attempts at manipulating the hand manipulated pointer input device; and
   a profile creation unit which uses the manipulation capabilities of the user to create the adaptive input profile.

40. The data processing system as recited in claim 31, further comprising:
   a modifying unit which modifies the adaptive input profile in response to information determined from the received input pointer data.

* * * * *

UNITED STATES PATENT AND TRADEMARK OFFICE
CERTIFICATE OF CORRECTION

| | | |
|---|---|---|
| PATENT NO. | : 6,963,937 B1 | Page 1 of 1 |
| APPLICATION NO. | : 09/213660 | |
| DATED | : November 8, 2005 | |
| INVENTOR(S) | : Kamper et al. | |

It is certified that error appears in the above-identified patent and that said Letters Patent is hereby corrected as shown below:

Col. 16, line 42: after "of the" delete "band" and insert --hand--.

Signed and Sealed this

Twenty-eighth Day of November, 2006

JON W. DUDAS
*Director of the United States Patent and Trademark Office*